US007034656B2

(12) United States Patent
Buchner

(10) Patent No.: US 7,034,656 B2
(45) Date of Patent: Apr. 25, 2006

(54) METHOD FOR IDENTIFYING THE POSITION OF A PORTABLE TRANSPONDER, AND AN ANTITHEFT SYSTEM

(75) Inventor: Reiner Buchner, Viehhausen (DE)

(73) Assignee: Siemens Aktiengesellschaft, Munich (DE)

( * ) Notice: Subject to any disclaimer, the term of this patent is extended or adjusted under 35 U.S.C. 154(b) by 227 days.

(21) Appl. No.: 10/293,134

(22) Filed: Nov. 13, 2002

(65) Prior Publication Data

US 2004/0207510 A1 Oct. 21, 2004

Related U.S. Application Data

(63) Continuation of application No. PCT/DE01/01889, filed on May 17, 2001.

(30) Foreign Application Priority Data

May 26, 2000 (DE) ................................ 100 26 271

(51) Int. Cl.
*G06F 7/04* (2006.01)

(52) U.S. Cl. ..................................... 340/5.61; 340/10.1

(58) Field of Classification Search ............... 340/5.61, 340/5.62, 5.63, 5.72, 10.1, 425.16, 426.35; 307/10.5

See application file for complete search history.

(56) References Cited

U.S. PATENT DOCUMENTS

| | | | | |
|---|---|---|---|---|
| 5,128,873 | A | 7/1992 | Gilmour et al. | 364/451 |
| 5,157,408 | A | 10/1992 | Wagner et al. | 342/399 |
| 5,170,172 | A | 12/1992 | Weinstein | 342/458 |
| 6,208,239 | B1 * | 3/2001 | Muller et al. | 340/426.35 |
| 6,218,932 | B1 * | 4/2001 | Stippler | 340/426.16 |
| 6,747,545 | B1 * | 6/2004 | Nowottnick et al. | 340/5.61 |
| 2002/0109581 | A1 * | 8/2002 | Blatz | 340/5.61 |

FOREIGN PATENT DOCUMENTS

EP 0 980 800 A2 2/2000

* cited by examiner

*Primary Examiner*—Edwin C. Holloway, III
(74) *Attorney, Agent, or Firm*—Baker Botts L.L.P.

(57) ABSTRACT

A method for the recognition of the proximity of a portable transponder (20) to a base station (2), comprises the steps of: the base station transmits a first test signal with a defined power, the transponder determines the field strength with which it received the first test signal, and transmits a response signal to the base station containing said field strength and the base station stores the same. The transponder transmits a second test signal with a defined power, the base station determines the field strength with which it receives the second test signal and determines, from a comparison of the two field strengths, whether the transponder is in the vicinity thereof.

13 Claims, 2 Drawing Sheets

METHOD FOR IDENTIFYING THE POSITION OF A PORTABLE TRANSPONDER, AND AN ANTITHEFT SYSTEM

CROSS REFERENCE TO RELATED APPLICATION

This application is a continuation of copending International Application No. PCT/DE01/01889 filed May 17, 2001, which designates the United States, and claims priority to German application number 10026271.6 filed May 26, 2000.

BACKGROUND OF THE INVENTION

The invention relates to a method for identifying a portable transponder as being located in the near area of a transmitting antenna of a base station, and to an antitheft system for a motor vehicle.

One problem that occurs with antitheft systems for motor vehicles which operate by means of wire-free communication between a base station fixed to the vehicle and a portable transponder, is as follows:

The transmission power of the base station and of the transponder are generally fixed such that signals from the base station are received by the transponder only in a near area, that is to say in the immediate transmission area of the transmitting antenna of the base station and, in addition, signals from the transponder are received by the base station only when the transponder is located in the near area. By manipulation, it is possible to eavesdrop on the communication path between the base station and the transponder and to reproduce the signals from a long distance.

SUMMARY OF THE INVENTION

The invention is based on the object of overcoming the problem mentioned above.

A first solution for this object is a method for identifying a portable transponder as being located in the near area of a transmitting antenna of a base station, in which the base station sends a first test signal with a defined power level, the transponder determines the field strength with which it receives the first test signal and sends a response signal, which contains the field strength of the first test signal, to the base station, the base station stores the field strength with which the transponder has received the first test signal, the transponder sends a second test signal with a defined power level, the base station determines the field strength with which it receives the second test signal, and the two field strengths are compared in order to determine whether the transponder is located in the near area of the transmitting antenna of the base station.

The information contained in the response signal relating to the field strength of the first test signal can be encrypted. The transponder can send the response signal essentially at the same time as the second test signal.

Another solution is a method for identifying a portable transponder as being located in the near area of a transmitting antenna of a base station, comprising the steps of:

- transmitting a request signal to the portable transponder;
- determining the field strength of the transmitted signal in the transponder;
- transmitting a response signal to the base station;
- transmitting the determined field strength to the base station;
- determining the field strength of the response signal;
- comparing the field strengths of the request signal and the response signal.

The transmission of the response signal and the determined field strength of the request signal can be combined to a single transmission. The determined field strength can be transmitted together with a first response signal to the base station and wherein a second response signal is transmitted after a time delay. The base station can store the determined field strength of the request signal. The base station may determine that the transponder is within the near area if the difference between the field strength of the request signal and the response signal are within a predefined range. The request signal can comprises an identification number. The transmitted signals and/or the combined signals can be data encrypted.

An embodiment according to the present invention is for example an antitheft system for a motor vehicle, containing a base station which is fixed to the vehicle and having a transmitting/receiving unit for wire-free communication with a transmitting/receiving unit of a portable transponder in which code information is stored, which can be sent from the transponder to the base station for authorization checking, with specific vehicle functions being enabled only after a positive authorization check, which base station and which transponder are designed such that the base station sends a first test signal with a predetermined power level, the transponder determines the field strength with which it receives the first test signal and sends a response signal with information about this field strength, the base station stores the received information about the field strength in a memory device, the transponder sends a second test signal with a predetermined power level, the base station determines the field strength with which the second test signal is received, compares the received field strength with the stored field strength and, in the event of any discrepancy which is greater than a predetermined level, assesses that the transponder is located outside the near area of the transmitting antenna of the base station.

According to the invention, the transponder signals to the base station the field strength or intensity with which the transponder receives a first test signal which is sent by the base station with a predetermined power level. The transponder then sends a second test signal with a predetermined power level. The field strength with which this second test signal is received is determined in the base station. By comparing the two field strengths, it is possible to decide whether the transponder is or is not located in the near area or immediate transmission area of the transmitting antenna of the base station. If it is found that the transponder is located outside the near area, the functions which are initiated by the base station on the basis of signals received from the transponder can be inhibited.

The method according to the invention is thus suitable for all applications in which any functions can be initiated from a base station or from a transponder, but in which this is intended to happen only when the transponder and the base station are located within a mutual immediate transmission area.

The features of claim 2 further improve the security against manipulation.

Claim 3 is aimed at an advantageous embodiment of the method which ensures that the transponder virtually does not move between the evaluation of the two test signals.

Claim 4 characterizes the basic design of an antitheft system for motor vehicles in order to achieve the object according to the invention.

BRIEF DESCRIPTION OF THE DRAWINGS

The invention will be explained in the following text with further details and with reference to schematic drawings, by way of example, in which.

DETAILED DESCRIPTION OF THE PREFERRED EMBODIMENTS

Figure 1:
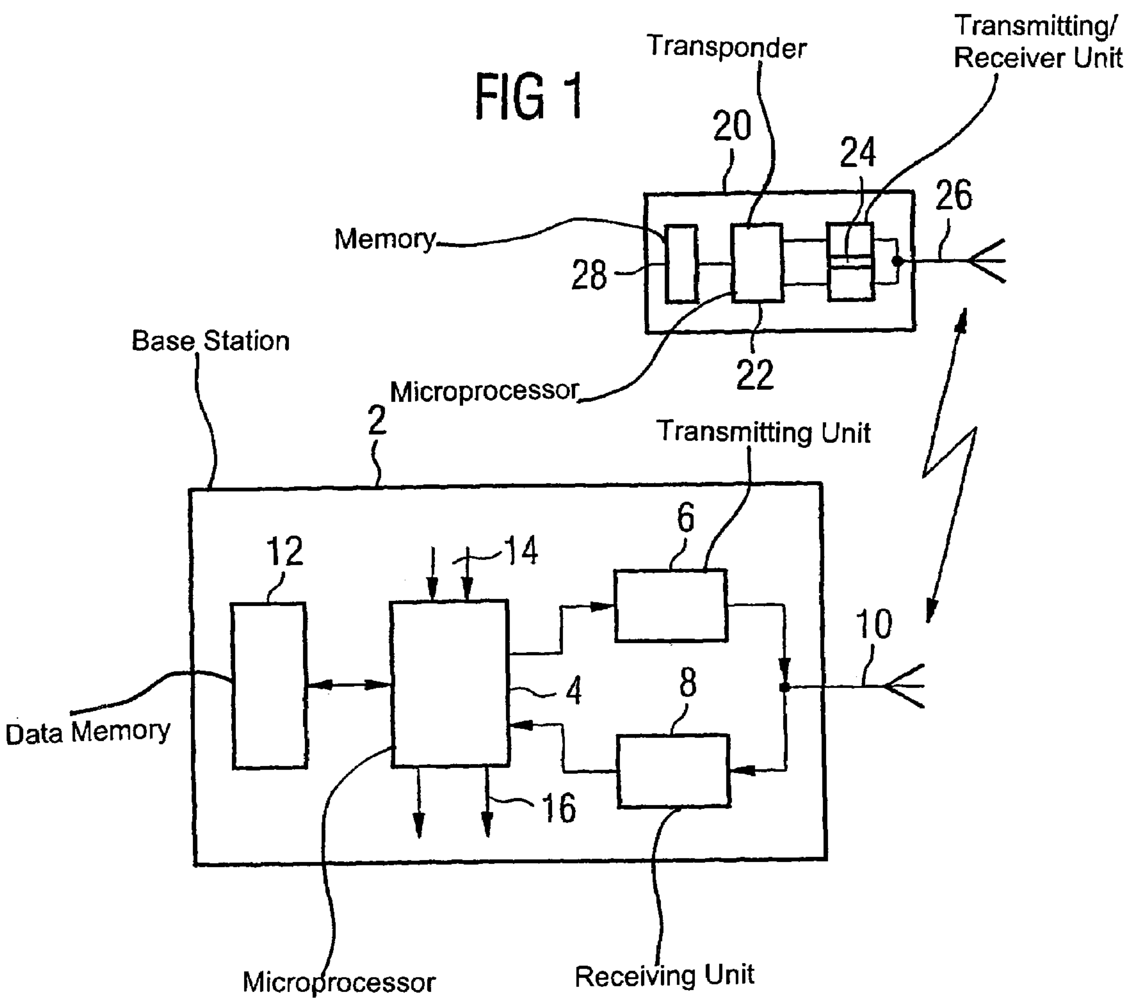
FIG. 1 shows a block diagram with a base station and a transponder.

As shown in FIG. 1, a base station 2 of an antitheft system, which is installed by way of example in a motor vehicle, has a microprocessor 4 which is connected via a transmitting unit 6 and a receiving unit 8 to an antenna 10, and which is suitable for interchanging data with a data memory 12. Further inputs of the microprocessor 4 are annotated 14, and further outputs are annotated 16.

The base station 2 is integrated in the motor vehicle power supply system and, depending on the signals at its inputs 14, initiates specific procedures which, via the outputs 16, then lead to specific functions in the vehicle.

A transponder 20 contains a microprocessor 22, a transmitting/receiving unit 24, a transmitting/receiving antenna 26 and a memory 28. The figure does not show any power supply for said units.

The design and operation of said modules as well as their interaction in an antitheft system for a motor vehicle are known per se, and will therefore not be explained in detail. One function for example consists of the base station 2 sending a request signal when a signal which is produced by a proximity sensor or, for example, by pulling on a door handle is present at the inputs 14, and the transponder 20 responding to the reception of this request signal with a response signal which contains code information that is stored in the transponder 20. After reception by the base station 2, this code information is compared with code information that is stored there and, if the comparison is positive, access to the vehicle, for example, is allowed.

Figure 2:
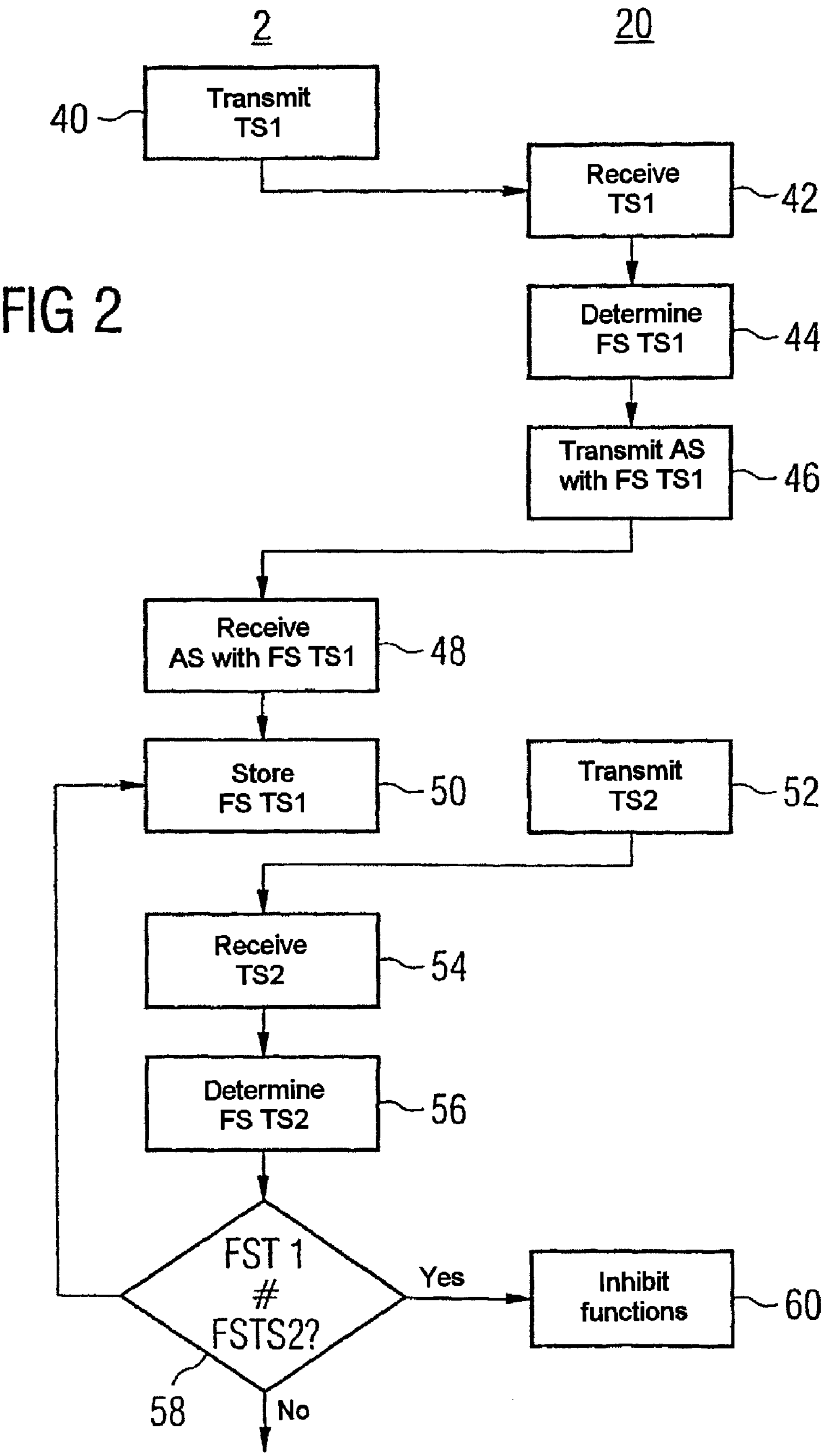
FIG. 2 shows a flowchart in order to explain the method according to the invention.

The range of the signals which are sent from the base station via its antenna 10 is comparatively short and, for example, is less than 100 m. In order to check whether the transponder 20 is actually located within the near area of the base station 2 and the range or communication path has not been increased by manipulation, a communication cycle takes place which is initiated, for example, by the microprocessor 4 when specific conditions are satisfied, for example by the enabling of access to the vehicle, and this communication cycle will be explained with reference to FIG. 2:

In a first step 40, the base station 40 sends a first test signal TS1 with a predetermined power level. This first test signal is normally received by the transponder 20 in the step 42, in response to which the field strength of the first test signal is determined in the transponder 20, in the step 44. The transponder 20 sends a response signal in the step 46, with information about the field strength with which the first test signal was received. (If the transponder does not send a response signal, then any function which may be currently enabled is inhibited). In the step 48, the base station 2 receives the response signal with the information about the field strength with which the first test signal was received by the transponder 20. In the step 50, the base station 2 stores in the memory 12 the information about the field strength with which the first test signal was received (FIG. 1).

In the step 52, the transponder 20 sends a second test signal TS2 with a predetermined power level for example with a predetermined short time delay with respect to the response signal which was sent in step 46. This second test signal TS2 is received by the base station 2 in the step 54, and the field strength with which the second test signal was received is determined in the step 56.

The field strength with which the first test signal was received by the transponder 20 is compared in the step 58 with the field strength with which the second test signal was received by the base station 2. If the discrepancy between the two field strengths exceeds a predetermined level, this is assessed as meaning that the transponder 20 is located beyond the near area of the base station 2 and, in the step 60, functions are inhibited which can normally be initiated by a positive authorization check of the transponder. If not, the transponder is assessed as being located correctly in the near area, so that the antitheft system operates as normal.

The location of the transponder can be deduced from the field strength comparison for the following reasons:

It is assumed that the power levels with which the two test signals are sent are the same, and that the efficiencies of the antennas are likewise the same. In this case, the field strengths must be of equal magnitude.

If the power levels with which the test signals are sent are the same but, for example, the transmission efficiency of the antenna of the transponder is not as good, then the system is aware of this poorer efficiency and can take it into account in the comparison. It is extraordinarily improbable that an additional transmitting/receiving unit which is being used for manipulation will have precisely the same transmission efficiency, so that a manipulation will result in a different discrepancy between the two field strengths. In a similar way, the test signal which is sent by the transponder may have a weaker transmission power level, of which the system is aware, and this is likewise taken into account in the comparison.

The system may be modified and added to in a large number of ways:

For example, the response signal which is sent in step 46 may itself be the test signal 2, so that the steps 46 and 52 coincide, and the steps 48, 50, 54 and 56 can be carried out in parallel. The system may contain a number of transponders which can be addressed specifically via their codes, so that they can be evaluated separately to determine whether they are located in the near area. The data storage medium may be in the form of a transponder without its own power supply. The information about the field strength with which the test signal was received in the step 42, which information is contained in the response signal sent in the step 46, is advantageously encrypted, so that external third parties cannot activate this information, which could then be used for manipulation of the transmission power level of the test signal sent by the transponder. Information about the transmission strength of the test signal could be sent with the test signal that is sent by the transponder, on the basis of which the base station determines the range to the transponder. It is self-evident that this information is also advantageously sent in encrypted form.

The invention claimed is:

1. A method for identifying whether a portable transponder is located in the near area of a transmitting antenna of a base station, said method comprising:

the base station sends a first test signal with a defined power level, the transponder determines the field strength with which it receives the first test signal and sends a response signal to the base station, said response signal contains the field strength of the first test signal, the base station stores the field strength with which the transponder received the first test signal, the transponder sends a second test signal with a defined power level, the base station determines the field strength with which it receives the second test signal, and the two field strengths are compared in order to determine whether the transponder is located in the near area of the transmitting antenna of the base station.

2. The method as claimed in claim 1, in which the information contained in the response signal relating to the field strength of the first test signal is encrypted.

3. The method as claimed in claim 1, in which the transponder sends the response signal essentially at the same time as the second test signal.

4. The method as claimed in claim 2, in which the transponder sends the response signal essentially at the same time as the second test signal.

5. An antitheft system for a motor vehicle, said system comprising:

a base station fixed to the vehicle and having a transmitting/receiving unit for wireless communication with a transmitting/receiving unit of a portable transponder having code information stored therein, said code information may be sent from the transponder to the base station for authorization, wherein specific vehicle functions are being enabled only after a positive authorization check, the base station and the transponder are designed such that the base station sends a first test signal with a predetermined power level, the transponder determines the field strength of the first test signal received and sends a response signal with information about said field strength, the base station stores the received field strength information strength in a memory device, the transponder sends a second test signal with a predetermined power level, the base station determines the field strength of the second test signal received, compares the received field strength with the stored field strength and, in the event of any discrepancy which is greater than a predetermined level, determines that the transponder is located outside the near area of the transmitting antenna of the base station.

6. A method for identifying a portable transponder as being located in the near area of a transmitting antenna of a base station, comprising the steps of:

transmitting a request signal to the portable transponder;

determining the field strength of the transmitted signal in the transponder;

transmitting a response signal to the base station;

transmitting the determined field strength to the base station;

determining the field strength of the response signal;

comparing the field strengths of the request signal and the response signal.

7. The method of claim 6, wherein the transmission of the response signal and the determined field strength of the request signal are combined to a single transmission.

8. The method of claim 6, wherein the determined field strength is transmitted together with a first response signal to the base station and wherein a second response signal is transmitted after a time delay.

9. The method of claim 6, wherein the base station stores the determined field strength of the request signal.

10. The method of claim 6, wherein the base station determines that the transponder is within the near area if the difference between the field strength of the request signal and the response signal are within a predefined range.

11. The method of claim 6, wherein the request signal comprises an identification number.

12. The method of claim 6, wherein the transmitted signals are data encrypted.

13. The method of claim 7, wherein the combined signals are data encrypted.

* * * * *